US005552789A

United States Patent [19]
Schuermann

[11] Patent Number: 5,552,789
[45] Date of Patent: Sep. 3, 1996

[54] INTEGRATED VEHICLE COMMUNICATIONS SYSTEM

[75] Inventor: Josef H. Schuermann, Oberhummel, Germany

[73] Assignee: Texas Instruments Deutschland GmbH, Germany

[21] Appl. No.: 196,678

[22] Filed: Feb. 14, 1994

[51] Int. Cl.$^6$ ..................................................... G01S 13/75
[52] U.S. Cl. ........................... 342/42; 340/825.31/825.54
[58] Field of Search ......................... 340/825.31, 825.33, 340/825.54, 825.69, 825.72, 905; 342/44, 42, 51; 307/10.1, 10.3, 10.5, 10.6, 9.1

[56] References Cited

U.S. PATENT DOCUMENTS

| | | | |
|---|---|---|---|
| 3,713,148 | 1/1973 | Cardullo et al. | 342/42 |
| 4,333,072 | 6/1982 | Beigel | 340/825.54 |
| 4,688,036 | 8/1987 | Hirano et al. | 340/825.54 |
| 4,738,334 | 4/1988 | Weishaupt | 307/10.5 |
| 4,912,471 | 3/1990 | Tyburski et al. | 342/42 |
| 4,918,955 | 4/1990 | Kimura et al. | 70/277 |
| 5,053,774 | 10/1991 | Schuermann et al. | 342/44 |
| 5,113,182 | 5/1992 | Suman et al. | 340/825.31 |
| 5,211,129 | 5/1993 | Taylor et al. | 119/3 |
| 5,214,409 | 5/1993 | Beigel | 340/572 |
| 5,257,011 | 10/1993 | Beigel | 340/572 |

OTHER PUBLICATIONS

Komanecky et al, Mark R., "IVHS Applications of Smart Cards", Vehicle Navigation & Information Systems Conference Proceedings (VNIS '91), Society of Automotive Engineers, Inc., Conference Co–sponsored by IEEE Vehicular Technology Society, pp. 977–987.

*Primary Examiner*—Ian J. Lobo
*Attorney, Agent, or Firm*—Bret J. Petersen; James C. Kesterson; Richard L. Donaldson

[57] ABSTRACT

An integrated vehicle communications system for on-board use within a vehicle which may also communicate with external portions of the system which includes miniaturized, self-contained read/write transponders 20, 22, 30 of the type disclosed in Schuermann U.S. Pat. No. 5,053,774, for providing functions within the vehicle, e.g., for sensing conditions and parameters, The on-board interrogation unit 10 interrogates and receives signals by RF communication provided by on-board antennas 14, 26, 28 between the interrogation unit and respective transponders for read/write responder operation. The processor 33 with display device 34*a* and/or control circuits 34*b* carries out on-board functions in response to such interrogation. A transponder 22 may serve as a vehicle operator key by which the system may verify key code, unlock the vehicle doors, as well as select and perform initialization functions including ignition, seat and seat belt adjustment, mirror positioning, and antitheft functions before vehicle entry by the operator. A transponder 30 may access external control data for premises or toll access, and may provide toll or credit or service transactions, as for authorization or verification or toll charge debiting purposes. The system may include also IR links.

32 Claims, 2 Drawing Sheets

INTEGRATED VEHICLE COMMUNICATIONS SYSTEM

BACKGROUND OF THE INVENTION

1. Field of the Invention

The invention relates to systems for automotive control and warning and communication within and with respect to vehicles. Wired automotive systems as so used for control and warning functions have at times been referred to us as automotive wiring systems or as automotive electrical systems but may be generically regarded as automotive signal and control systems. The invention specifically relates to a novel integrated vehicle communications system for such signal and control purposes.

2. Related Art

A "vehicle" as used in this disclosure means any automotive vehicle or other automotive apparatus, machine, device, mechanized equipment or craft in which the presently disclosed system may be useful. Such usage includes private or commercial passenger vehicles, such as cars, trucks and buses, or such as cargo and other commercial vehicles, as well as aircraft and watercraft.

By "operator" or "driver" is meant in this disclosure any person or crew who operates such a vehicle or who may be equipped or potentially recognized by the presently disclosed system to be an authorized operator, driver or user of such a vehicle.

The term "on-board" or "internal" in the present disclosure connotes the characteristic of being carried aboard or upon or within such a vehicle. "External" or "outboard" connotes a characteristic of being exterior to and/or remote from such vehicle.

In known applications of automotive control and warning for vehicles, it has been known to employ vehicle remote signalling devices providing operator control typically limited to simple vehicle operator-to-vehicle commands such as door, hood and trunk lock and unlock, vehicle lighting and ignition control and anti-theft arm and disarm. Thus it is known to employ small battery-operated radio frequency (RF) devices of limited range, such as garage door opening controls, as well as small battery-operated infrared (IR) radiation signalling devices for door locking or vehicle security system enablement/disablement. Further, such hand-held signalling devices are typically unable to receive and store externally transmitted messages originating from the vehicle or from outside agencies.

Self-contained, miniaturized transponders are now known that employ an interrogator-responder arrangement having an EEPROM data storage device and a capacitor used as an energy accumulator by being charged by the energy of radio frequency interrogation to power the responder. Such a transponder arrangement is disclosed in Schuermann et al U.S. Pat. No. 5,053,774, of the present inventor. Said Schuermann et al U.S. Pat. 5,053,774, is herein incorporated by reference. Other interrogator/transponder arrangements and transponder operating modes can also be used for automotive control and warning systems.

A need in the art exists to provide vehicle on-board automotive communication system which can provide signalling and control for multiple vehicle and/or operator functions. It is desired to be able to use the transponders in a vehicle communications system for such purposes.

It is desired to be able specifically to use such transponders of Schuermann U.S Pat. 5,053,774 in a vehicle communications system for such purposes.

SUMMARY OF THE INVENTION

The invention relates to an automotive signal and control system with which a vehicle is to be equipped. The system may be generically referred to as a automotive on-board integrated signal communications and control system, and is herein termed integrated vehicle communications system.

The invention provides such a system having special utility, namely an on-board integrated automotive communication system providing signalling and control and other types of communication for multiple vehicle and/or operator functions within the vehicle, as well as for other purposes discussed herein, and specifically by employing within a vehicle or accessories like vehicle keys one or more self-contained read/write transponders for various purposes. Such functions and purposes may include, among others, initialization, control, monitoring and other communication within or with the vehicle, as well as still others indicated below. Advantageous use of the invention may be especially made in connection with vehicles such as private or commercial passenger vehicles. Potential automotive applications of the invention may include, in addition to private or commercial passenger vehicles, trucks and buses, or such as cargo and other commercial vehicles, as well as aircraft and watercraft.

The invention thus contemplates a multichannel integrated communications system for establishing communication links between and among (a) the vehicle user/operator (whether within or outside the vehicle), as by equipage of the operator with system components and by means of displays, (b) the operator station of a vehicle, including displays, seat, and other operator controls and accessories, (c) vehicle internal sub-systems and components, and (d) data, information, authorization, or interrogation sources external to the vehicle.

The proposed automotive communications system advantageously employs within a vehicle plural self-contained read/write transponders for purposes, among others, of initialization, control, monitoring and other communication, and wherein the plural self-contained read/write transponders provide communication with a central in-vehicle read/write message interrogator, i.e., a controller, and display unit of the system for initialization, control, monitoring and other communication, among possible others, namely: for performing a multiplicity of initialization and monitoring functions internal to the vehicle and communication such as for enhanced driver control and convenience; for carrying out credit transaction approval or validation and debiting as at toll stations, as well as gaining entry to controlled facilities, portals and trafficway control, e.g., for parking access or for trafficway access and charge stations, en-route toll stations; and for delivery of operator warning and alert messages or signals, as delivered to the vehicle by broadcast road alert and warning transmitters.

The proposed vehicle communications system may use its on-board transponders as the means of identifying and instrumenting vehicle components, e.g., road wheel presence, identification, tire temperature and pressure, as may be signalled from wheel mounted transponders of the system.

Transponders of the new vehicle communications system can be configured to provide a complete vehicle antitheft and security surveillance system as well as to provide an emergency or personal safety system where, for example, the driver or key holder activates the car alarm by means of a button or switch on the key.

As a further advantage of the invention it is noted that such transponders with their individual memories with read/ write capabilities and identification capabilities provide within a vehicle a system of decentralized memory (of read/write type) and identification functions not heretofore practical for vehicle communication and control systems.

Briefly, an integrated vehicle communications system for on-board use within a vehicle comprises at least one but preferably a plurality of miniaturized, self-contained read/write transponders each having means charged by the energy of radio frequency interrogation for serving as the power source for the respective read/write transponder operation, the transponders each providing a vehicle function. An interrogation unit, i.e., controller, on-board the vehicle interrogates and receiving signals from the respective transponders. Means is included, comprising small on-board antennas, for providing RF communication links between the interrogation unit and each of the transponders for read/write responder operation by them in response to interrogation. Display and/or auxiliary control circuits serve as means responsive to the interrogation unit for carrying out on-board functions in response to such operation.

Preferably, the new vehicle communications system may utilize miniature self-contained transponders of type and a so-called TIRIS reader, i.e., an interrogation unit, as disclosed in said Schuermann U.S. Pat. No. 5,053,774. Such transponders employ an interrogator responder arrangement having an EEPROM data storage device and a small capacitor serving as an energy accumulator charged by the energy of radio frequency interrogation to power the transponders which may accordingly send, receive and store digital data. The transponders are determined to be sufficiently small to be inconspicuously mounted inside or outside the vehicle and to replace or supplement a conventional vehicle door and ignition key. The TIRIS reader is used to interrogate and thus monitor such transponders, any is combined with a processor as well as display and control means suitable to achieving the intended functions, conveniences and advantages of the new vehicle communications system.

In a system of the present invention plural transponders preferably may be inconspicuously located on-board the vehicle or hand-carried by an operator, in the form of a key transponder, to permit access to the vehicle and to receive and store received data from external sources.

The group of transponders are thus monitored by the TIRIS reader as an on-board controller/interrogator (the term TIRIS being an acronym known to some persons skilled in the art as denoting certain types of equipment utilizing the transponder arrangement is disclosed in said Schuermann et al U.S. Pat. No. 5,053,774) by reading from and writing to individual transponders, processing received messages, displaying messages on request or automatically displaying alerts and warnings which require the vehicle operator's immediate attention.

The group of transponders operating under the control of the TIRIS reader permits a flow of information among or between the vehicle operator, vehicle systems and components, and outside sources such as road toll, parking toll and broadcast alert stations.

The key transponder provides outboard response before operator entry of the vehicle by responding to the TIRIS reader by transmitting the vehicle identifying code. The TIRIS reader may thus verify the key code, unlock the vehicle doors, as well as select and perform vehicle initialization functions including but not limited to ignition, seat and seat belt adjustment, mirror positioning, and antitheft device reset as the operator approaches the vehicle, and taking a seat in the vehicle. The key transponder may service as media for parking access, toll charge credit, credit update, deduction and billings by receiving and storing messages from suitably equipped vehicle parking stations, and provide still other functions.

Other objects will be in part apparent and in part pointed out below.

DETAILED DESCRIPTION OF THE PREFERRED EMBODIMENTS

Figure 1:
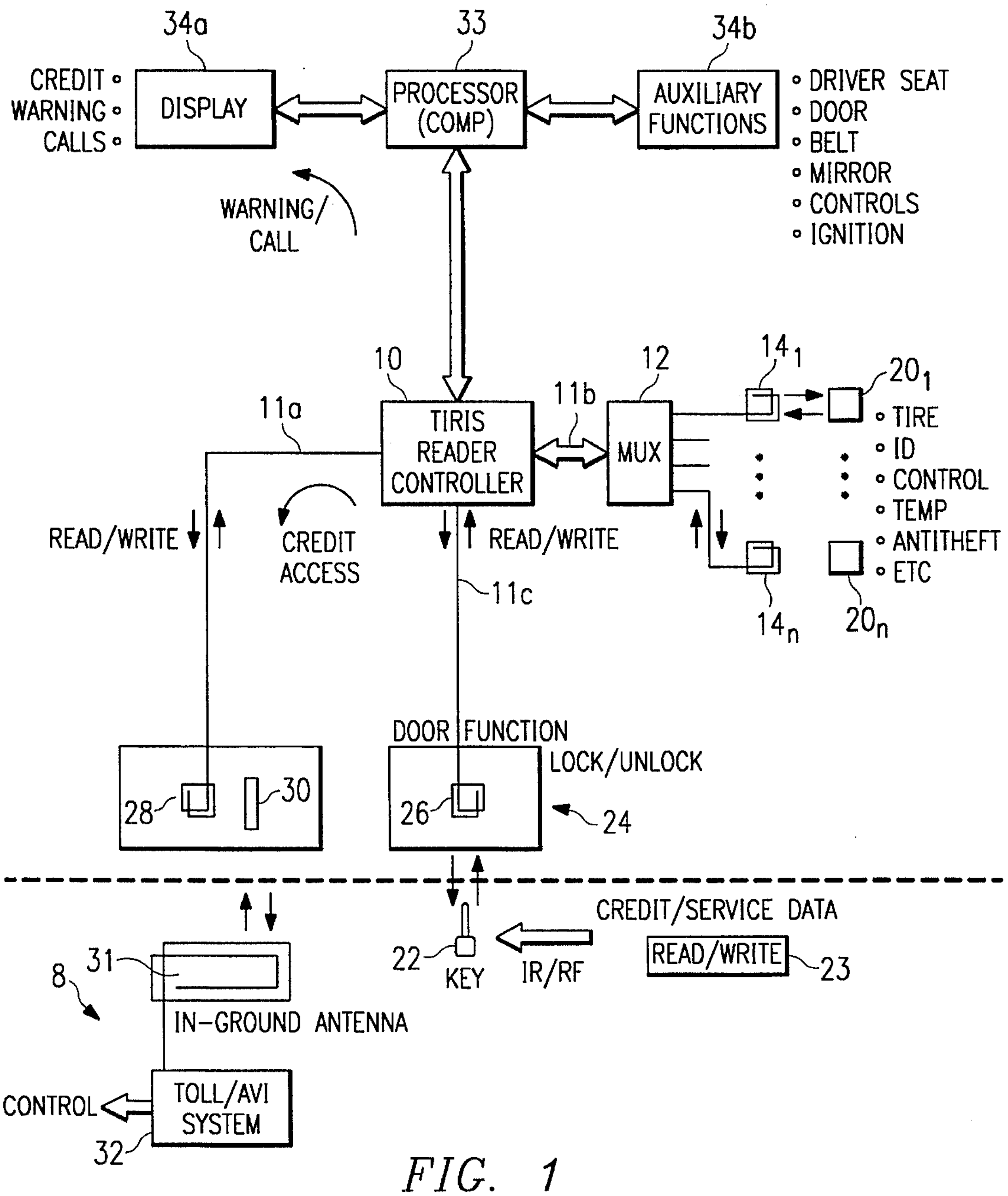
FIG. 1 is a top-level functional block diagram which shows the functional elements and data paths of a preferred embodiment of the invention as realized by the interconnection of an array of read/write transponders, message processor, display and TIRIS reader in accordance with the invention.

Referring to FIG. 1, there is shown an integrated vehicle communications system according to the teachings of this invention. In FIG. 1 interrelationship between elements of the system as well as data path bi-directionality is depicted symbolically; so also certain components of the system are shown in block or symbolic form.

Figure 2:
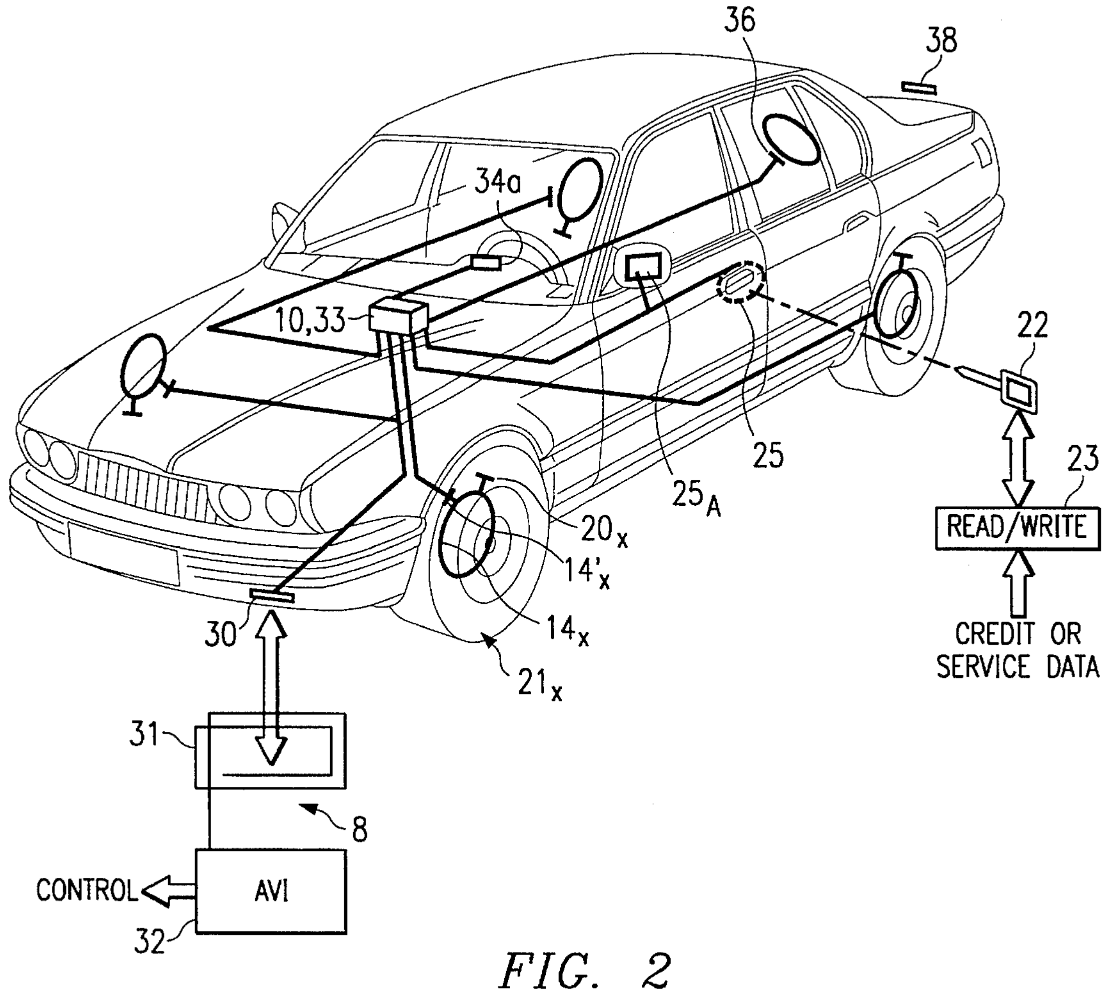
FIG. 2 is schematic illustration of a vehicle equipped with a system of the invention which includes the capability of interaction with road side or stationary based systems and functions.

FIG. 2 illustrates a vehicle which has installed a system according to the teachings of this invention such as shown in FIG. 1. Also shown in FIG. 1, as an example only, is the in-ground portion 8 of an AVI or parking lot access system which communicates with the system aboard the illustrated vehicle. In FIG. 2 interrelationship between elements of the various systems is shown symbolically.

In the embodiments shown in FIGS. 1 and 2 a central interrogation unit 10 (as may be referred to simply as controller 10) interrogates and receives signals (that is, communicates) in multiplexed manner by means of a suitable multiplexer 12 of known type through respective on-board loop antennas 14 with one of several possible groups such as group 20' of miniaturized, self-contained read/write transponders (or which may be termed responders) $\mathbf{20}_1 \ldots \mathbf{20}_n$ installed on-board the vehicle, each such transponder being thus part of a read/write transponder system and each having an integrated circuit device serving as charge storage, i.e., energy accumulation, means which is charged by the energy of an RF interrogation pulse as the sole power source for read/write transponder operation according to the disclosure of the above identified Schuermann et al U.S. Pat. No. 5,053,774. In read/write cycles, the respective transponder first receives an interrogation signal pulse from the interrogation means and then responds to the interrogation means, with data characteristic to the transponder and/or the condition and/or parameter monitored by the sensor, under the power of the RF energy accumulated. It will also be appreciated that transponders with or without secondary functions can be employed as sensors which have batteries or the like as power sources. However, as discussed above in the embodiment shown in FIG. 1, the powering signal is also used as an interrogation pulse to activate a transponder.

There are several tiny or miniature transponders which are suitable for incorporating into the present invention. The various types of transponders also may use various communication techniques. For example, although the TIRIS system as set forth in the Schuermann et al patent, U.S. Pat. No.

5,053,774, and discussed in more detail hereinafter uses a half duplex (HDX) technique, other possible transponder communication techniques may use a full duplex (FDX) technique; such as, for example, disclosed in U.S. Pat. No. 4,912,471 by Tyburski et al, U.S. Pat. No. 5,211,129 by Taylor et al, U.S. Pat. Nos. 4,333,072, 5,214,409, 5,257,011 to Beigel, and U.S. Pat. No. 4,918,955 to Kimura et al and all are herein incorporated by reference.

In addition, whereas the reader in the HDX system disclosed in Schuermann et al interrogates with a first frequency $f_1$; such as, for example, around 134.2 KHz and then after the interrogation pulse ends, the transponder responds at that same frequency (about 134.2 KHz) along with a second frequency very slightly shifted from $f_1$ (such as, for example only, 124.2 or 144.2 KHz) so as to separately designate "0"'s and "1"'s. Other HDX communication techniques may interrogate at a first frequency; such as, for example, 400 KHz) and this responds at a frequency significantly shifted from the interrogation frequency (such as, for example 200 KHz).

The new integrated vehicle communications system could have a single such transponder. But advantages of the invention are best realized by using plural such transponders, wherein the transponders provide various functions for control, sensing and/or communication and other purposes according to the present disclosure.

The transponders are carried within or upon the vehicle for providing an appropriate respective vehicle function, i.e. a specific use, which is useful for or in the vehicle or its operator; such as, for example, monitoring a parameter such as temperature, a condition, the presence or absence of another object such as part of the vehicle, or the existence, absence or verification of certain data. Still other possible such transponders may be carried by operator of the vehicle, or serving in an identification ("ID") mode or as part of a further communication link, as described below.

The group of transponders such as those designated $20_1$ . . . $20_n$ thus will be interrogated and thereby monitored by controller 10 which may preferably be (and may herein be referred to as) a TIRIS reader (the term TIRIS being an acronym known to some persons skilled in the art as denoting certain types of devices or equipment utilizing the transponder arrangement and TIRIS reader disclosed in said Schuermann et al U.S. Pat. 5,053,774). Controller 10 as thus constituted by a TIRIS reader is capable of detecting the proximity of, and reading from and writing to individual transponders, and as described below, and is further capable with related components described below of processing received messages, displaying messages on request or automatically displaying alerts and warnings which require the vehicle operator's immediate attention, by thus using means responsive to controller 10 for carrying out any of various possible on-board functions, such as those described representively in the following description, in response to such interrogation by controller 10 serving as interrogating means.

Communication between the TIRIS reader and what are thus seen to be satellite transponders is effected by means small loop antennas connected by circuit wiring such as designated 11*a*, 11*b*, 11*c* which connects controller 10 to such loop antennas which are located in proximity to the individual transponders. Multiplexer 12 is connected to several loop antennas $14_1$ . . . $14_n$ for communication with respective transponders $20_1$ . . . $20_n$ which are to be interrogated in successively repeated interrogation read or read/write cycles. The first such loop antenna $14_1$ is proximate to a first transponder $20_1$, and so forth.

Specifically such transponders employ an interrogator-responder arrangement having an EEPROM data storage device and a small capacitor serving as an energy accumulator charged by the energy of radio frequency interrogation to power the transponders which may accordingly send, receive and store digital data. The transponders are sufficiently small as to be inconspicuously mounted or carried within the vehicle at locations where a condition or parameter is to be directly monitored, and are suitable to replace existing devices heretofore used for monitoring such condition or parameter.

Transponders $20_1$ . . . $20_n$ for example may be affixed to components of the vehicle such as road wheels, e.g. to tires themselves (as by being buried in tire tread). Also a transponder may be affixed to wheels, brakes, brake components, and may not only carry data identifying the specific transponder but may also include condition-monitoring or parameter-monitoring means, e.g., temperature-monitoring components such as thermistors of suitable type such as of positive or negative thermal or switching characteristic. The transponders may include suitable switching or contact devices so as to serve as antitheft sensors, door switches, etc. In general, the transponders may include any of myriad position-monitoring, condition-monitoring or parameter-monitoring sensors or means.

As illustrated in FIG. 2 there may be such a transponder as typically illustrated as $20_x$ associated with a typical wheel assembly $21_x$ such as on a brake component for communication through a respective antenna, as typified by the antenna $14_x$, proximate to the wheel and brake assembly for allowing monitoring of brake condition such as overheat or wear by central data processing system 10. Alternatively transponder $20_x$ may be actually carried by the tire, and antenna $14_x$ carried peripherally at about the tire tread with there being a related counterpart antenna $14_x'$ coupling to antenna $14_x$ to be responsive by the detected presence or absence of transponder $20_x$ upon being interrogated by controller 10 to signal the presence of respective tires and wheels. A system warning may then be given by means 34*a* or 34*b* as may be appropriate, or an on-board alarm system may be activated. Such an arrangement is typical of the manner in which the various transponders of the system included in the vehicle shown in FIG. 2 are RF-coupled to controller 10 for interrogation/responder operation to provide functions useful for vehicle operation, control or communications, or useful for providing information to or for its operator.

As concerns the vehicle operator in particular, transponder 22 is of special significance. Transponder 22 may not only be carried by the operator on-board when operating the vehicle but also provides remote control for some functions of the vehicle when carried by the vehicle operator as the operator approaches the vehicle. Also, of course, transponder 22 may permit access to the vehicle. Transponder 22 may be termed accordingly a key transponder (or referred to simply as a key or an RF or radio key), may be used in place of, i.e., to replace or supplement, the conventional vehicle door and ignition keys. In addition, transponder 22 may accept data transmitted from the vehicle and from sources outside the vehicle. The operator may thus carry key 22 in lieu of a conventional type of key. For this purpose key 22 will communicate with a door module 24 suitably positioned at 25 or 25*a* on an operator door for example. The module typically will include a loop antenna 26 which communicates with controller 10.

Key 22 may thus be used for vehicle entry control by serving as the media to provide vehicle access control data.

The transponder data may be used to not only allow access to the vehicle but conceivably also might be used in its own right for access, for example, to a specific parking area or to premises where the vehicle is located. In addition, of course, the transponder alone or in combination with the mechanical aspects of the key may be used to provide ignition control. That is, until the proper identification code is provided to the automobile ignition control module, the automobile will not start or if started will not continue to run.

Credit or service data may be read or written to key 22 by suitable means 23 whether by RF or by IR link so as to update and/or interrogate key 22 as may be desired for enablement or changing or verification of certain functions, certain types of operation, or access to certain premises.

Key 22 may serve other functions as well. With its read/write function it may be used for direct or system communication with a toll booth or control point, as for carrying an operator-entitled credit limit. Thus, for example, it may enable, facilitate or authorize communication between the vehicle and a toll booth or other control or access point, by use of antenna 28 for communicating via another transponder 30 positioned for example on the front bumper of the vehicle. Such a location is suitable for communicating with a toll booth or control point, i.e., a point at which entrance will be permitted to an authorized vehicle or authorized operator who will be identified by operation of transponder 30. Identification transponder 30 may for these purposes communicate with an in-ground loop-type antenna 31 which is part of a toll or automatic vehicle identification (AVI) system 32 at the toll booth or control point.

When the vehicle passes through a toll station or control point, transponder 30, which may accordingly be termed the identification ("ID") transponder 30, may communicate with the toll/AVI control system 32 for conveying appropriate entry verification and credit authorization information. Antenna 28 will permit credit interrogation or identification verification signals to be received and transmitted by controller 10, and may in the case of a toll charge convey an updated credit limit. The credit information may be shared with or transmitted to or from key transponder 22 which may thus carry data unique to the operator, and there may be a handshake transaction or verification accordingly for permitting the operator of the vehicle to use a toll road and/or to pay tolls on it. By such means, credit debiting resulting from passage through the toll booth may take place together with automatic deduction up to a credit limit.

ID transponder 30 or key transponder 22 could be of a type using an IR data path rather than an RF link between the toll station and the vehicle. Thus, it will be understood that the configuration of the system does not preclude integration into the system of one or more IR links, and indeed may be implemented to advantage.

As a further alternative, ID transponder 30 may be of the type which includes an independent power source; such as, for example, a so-called flatpak type, or the transponder may use the vehicle power source. If the vehicle power source is used, the transponder will have greater operating speed and range. This will increase the data rate by enabling the transponder to transmit more rapidly upon interrogation than would be the case for a transponder transmission which only followed charge accumulation.

The system of FIG. 1 further comprises a read/write message processor 33 which may contain a central processor unit (CPU) having one or more microprocessors to communicate with the TIRIS reader, i.e., controller 10, to deliver information to either or both (a) an on-board display unit 34*a* for providing system information in the form of suitable alphanumeric or graphic display to the operator in response to interrogation/responder operation, such display being thus on the vehicle dashboard, for example; and/or (b) means 34*b* for carrying out specific vehicle on-board functions, such as driver automatic seat orientation adjustment or control, adjusting the driver mirror position, and possible other control functions. Such actions and/or operations may be in response to the detection exteriorly of the vehicle of key 22, where such orientations or adjustments may be those uniquely associated with the authorized holder of key 22. Processor 33 may thus issue commands via means 34*b* to vehicle components or vehicle subsystems appropriate to limits or parameters determined by key 22 or in response to signals from transponders $\mathbf{20}_1 \ldots \mathbf{20}_n$ and/or ID transponder 30. As a further example, vehicle performance or maximum speed may be limited or enabled according to the capabilities of the holder of key 22 or in response to the detection by transponder 30 and/or antenna 28 of an unsafe condition or the existence of an area limitation upon speed. It would also be possible to impose speed limitations as a function of the components, or equipment on the automobile, or safety conditions, (e.g., the conditions of the tires).

Regardless of the number of such transponders, the data encoded or stored in each transponder uniquely identifies the respective transponder to controller 10.

Within the vehicle as illustrated in FIG. 2, a system such as shown in FIG. 1 may be implemented in various novel ways. Thus, referring to FIG. 2, the TIRIS reader which constitutes controller 10 (which works in conjunction with processor 33) may cooperate with an antenna 36 with which there may be in RF relationship with a transponder 38 for detecting the presence of an approaching key 22, or which may instead be a transponder for monitoring or controlling another condition such as access to trunk or rear storage of the vehicle. Of course, such access to the trunk or rear storage may be with or without activating the car access or ignition systems.

In operation the group or groups of transponders such as 20' communicate bi-directionally with controller 10 which is the so-called TIRIS reader. The method of communication is by RF transmission to and from a loop antenna such as antenna 14. This type of such communication being multiplexed according to known procedures by multiplexer 12 under the control of the TIRIS reader by means of transmission with the respective antenna corresponding to each transponder. Transponders $\mathbf{20}_1$ to $\mathbf{20}_n$, 22 and 30 are regularly interrogated at regular time intervals by controller 10 via antennas such as loop antennas 14 and 26. Read/write message processor 33 communicates with the TIRIS Reader, delivers information to on-board display unit 34*a*, and issues commands to the vehicle subsystems in response to signals from key transponder 22.

As an exemplary sequence of vehicle accessing operations, the TIRIS reader 10 determines the presence of an approaching key transponder 22 carried by an operator by RF transmissions, e.g., at one second intervals for a duration of a few milliseconds. Such transmission supplies RF power to key transponder 22 which upon accumulating sufficient charge then transmits vehicle access codes to reader 10. After reception and verification, reader 10 via processor 33 and control means 34*b* causes the vehicle to unlock a door or doors, by energization of a known central door locking/unlocking system. At this time, vehicle subsystems such as seat, seat belts, mirror and ignition are initialized using previously stored user pre-set requirements via the read/write message processor 12 and the vehicle subsystems control means 34*b*.

Another safety embodiment can be realized by using the passive key 22 to signal an emergency or selected function at the automobile. This may be accomplished by pressing a switch located on the key such that when the reader determines the presence of a key, the key returns a signal which activates the car alarm.

The transmission range for vehicle access by the key transponder 22 similarly may be conveniently extended by means of a small battery; such as, for example only, the so-called flatpak type carried on a circuit board (not shown) carrying key transponder 22. As mentioned above, the transponder may be enabled in response to a suitable push switch (not shown) in which case controller 10 need function in receive mode only continuously or for predetermined intervals.

A further embodiment of the invention is the configuration of the system of FIG. 1 for advantageous use of such transponders to provide vehicle security, anti-theft and tampering surveillance functions. The group of such vehicle component transponders $\mathbf{20}_1$ to $\mathbf{20}_n$ shown in FIG. 1 may, for example, be mounted on or inside vehicle components such as road wheels and are regularly interrogated at regular time intervals by central data processing unit 10 via the suitable antennas such as loop antenna 14. Failure to detect the presence of one or more vehicle component transponders causes control 10 to activate vehicle anti-theft and/or alarm systems.

A further advantageous use of vehicle component transponders of the present type is their use as instrumentation devices. In the case of road wheels, the transponders integrated with appropriate transducers may signal tire temperature and air pressure to the TIRIS Reader for optional or priority display to the vehicle user.

As a further illustration of use, the presence of each of the tires of the vehicle may be monitored by a transponder such as of the type $\mathbf{20}_1$ at each tire, generally as depicted in FIG. 2. If a wheel is stolen, controller 10 may provide alarm signalling to thereby provide an antitheft function.

The interrogation pulse/read cycling indicated above is exemplary, but for energy saving purposes, interrogation of the various transponders $\mathbf{20}_1 \ldots \mathbf{20}_n$, key transponder 22 and any other transponders of the system such as transponder 30 may be interrogated periodically at a rate appropriate to the circumstances, such as with a duty cycle, for example, of a few msec or less during each interval of from about 1 sec to about 5 sec. It may be preferable that the transponders be interrogated only according to the practical frequency or at a permissible time interval of need for information. Most preferably, the interrogation controller 10 provides interrogating of the transponders at intervals measured in the order of seconds and for pulse durations measured in the order of a few milliseconds Another advantageous configuration or embodiment of the invention results from making use of the read/write capability of vehicle key transponder 22 so that it serves as a media to receive and store toll credit limits and charge deduction and billing information from a parking toll station and to write this information to the TIRIS reader, namely controller 10, for display by display means **34*a* and to the vehicle ID transponder 20 for parking access. Likewise, the read/write capability of the vehicle key transponder 22 may also provide access to a gasoline pump. In the case of vehicle parking, the vehicle key transponder 22 may also be used to receive credit limit and limit update messages from a stationary parking toll service station 28. Key transponder 22 retransmits this information to the vehicle via the vehicle ID transponder 30 which relays it to the TIRIS reader, namely controller 10, for storage and display on request. When the vehicle leaves the parking area, the vehicle identification transponder signals provide an identification to the toll station via in-ground antenna 28*a*** thus enabling user automatic charge deduction and/or billing.

In the case of vehicle operator-to-vehicle functions, in a typical sequence of operations, the TIRIS reader detects the proximity of vehicle key transponder 22 by transmitting a signal to the key transponder which responds by transmitting the vehicle identifying code. The TIRIS reader 10 may thus verify the key code, unlock the vehicle doors, as well as select and perform vehicle initialization functions including but not limited to ignition, seat and seat belt adjustment, mirror positioning, and antitheft device reset as would be appropriate for best enabling the intended vehicle operator for prospective operation of the vehicle just before operator entry of the vehicle. Thus, in operation the vehicle operator with the key transponder in hand or on the person approaches the vehicle. When key 22 is interrogated by controller 10 and then responds with the unique code identifying the key as that of an authorized operator, (i.e., an authorized key 22), the subsystems control means **34*b*** unlocks the vehicle door (as well as initiating such other functions as indicated above) and permits vehicle entry.

Vehicle key transponder 22 may also serve as the media to allow use and/or access other than vehicle entry. Such use and/or access includes parking or building access, toll charge credit, credit update, fee deduction and billings by receiving and storing messages from suitably equipped vehicle parking stations.

Thus, as an example, an advantageous method of using the key transponder 22 feature is to use it to receive access validation and parking location assignment from the toll station by verification procedure. During such use, the TIRIS reader, namely controller 10, will operate to permit access to special or secure areas, e.g., a restricted parking area or a security gate, by determining first that key transponder 22 is entitled to entry into a restricted area by having or providing a special access code. In this case the vehicle ID transponder 30 is caused to retransmit the special access code accordingly to a buried antenna like that at 31 or other receiving means to gain entry to the restricted area.

A further embodiment or realization of the invention includes provision for en-route data communications between the vehicle and a multiplicity of highway broadcast and signalling systems for the purposes of road toll charge and charge collection and accounting and the reception of broadcast alert and warning messages.

For purposes of en-route vehicle communications, the vehicle ID transponder 30 may be located on the underside of the vehicle rather than as shown, to be activated when the vehicle passes over in-ground loop antennas such as that designated 31. In the case of road toll station communications, in an exemplary sequence of operations an interrogation signal is addressed to the vehicle identification transponder by an in-ground antenna 31 and is detected by the TIRIS reader system controller 10 which responds with a vehicle identification transmission. After reception and validation of the vehicle identification, the toll station can perform appropriate toll charge and credit accounting, and then transmit toll statements back to the vehicle ID transponder 30 which routes the information to the controller 10 for storage and for optional display by display means **34*a*. Communications with roadside alert and warning stations are effected in a similar manner via communications with an in-ground antenna like that designated 31. Messages received may be either vehicle-specific to be processed only after validation of vehicle identification, or they may be a general broadcast or alerting nature. The TIRIS reader, namely controller 10, processes this information and may by means of display means 34***a* or suitable other warning device immediately signal the vehicle operator in the case of need for alerting or warning.

By system integration of read/write transponders and associated loop antennas with TIRIS reader and a user display enabled by the latter within the vehicle, there is thus provided an integrated novel system with capability of providing a comprehensive and convenient range of vehicle related controls and functions not heretofore practically achievable. Because of the read/write capability of the vehicle transponders, there are achieved further advantages of providing extra-vehicular communications to allow the vehicle operator access to enroute alert and warning messages, parking access, toll credit and accounting.

The present invention thus provides a multichannel communication system between the vehicle user, the vehicle internal subsystems and components, and data sources external to the vehicle including but not limited to, traveller alert and warning broadcast systems, vehicle parking access, toll collection, and automatic road toll approval and collections stations.

Thus, the invention comprehends an integrated vehicle communications system for on-board use within a vehicle, the system comprising miniaturized, self-contained read/write transponder means capable of accumulating energy of radio frequency interrogation as the power source for the respective read/write transponder operation, and providing a vehicle function thereby; an interrogation unit on-board the vehicle for interrogating and receiving signals from the transponder means; means for providing RF communication between the interrogation unit and the transponder means for read/write responder operation by the transponder means in response to interrogation operation of the interrogation unit; and means responsive to the interrogation unit for carrying out on-board functions in response to such interrogation.

In view of the foregoing, it will be seen that the several objects of the invention are achieved and other advantages are attained.

The embodiments were chosen and described in order to best explain the principles of the invention and its practical application to thereby enable others skilled in the art to best utilize the invention in various embodiments and with various modifications as are suited the particular use contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An integrated vehicle communications system for on-board use within a vehicle, the system comprising:

miniaturized, self-contained transponder means on-board said vehicle using radio frequency interrogation energy for the respective transponder operation and associated with a vehicle function;

interrogation means on-board the vehicle for interrogating and receiving signals from the transponder means;

means for providing RF communication between the interrogation means and the transponder means in response to interrogation operation of the interrogation means; and means responsive to the interrogation means for carrying out on-board functions in response to such interrogation.

2. The integrated vehicle communications system of claim 1 wherein said transponder further includes means for accumulating said radio frequency energy as a source of power.

3. An integrated vehicle communications system as set forth in claim 1 and further comprising a key transponder for use by a vehicle operator to replace or supplement a conventional vehicle key for vehicle entry control, the means for providing RF communication provides for communication between the interrogation means and the key transponder for interrogation of the key transponder as the vehicle operator with the key transponder approaches the vehicle, and wherein the means responsive to the interrogation unit permits vehicle entry if the key transponder authorizes such entry.

4. An integrated vehicle communications system as set forth in claim 3 wherein said key transponder also serves as media for access to premises use other than vehicle entry.

5. An integrated vehicle communications system as set forth in claim 3 wherein the means responsive to the interrogation means in addition to permitting vehicle entry if the key transponder authorizes such entry selects and performs vehicle initialization functions, such as ignition, seat and seat belt adjustment, if the key transponder authorizes such entry.

6. An integrated vehicle communications system as set forth in claim 3 wherein the key transponder enables credit transactions with a facility external of the vehicle.

7. An integrated vehicle communications system as set forth in claim 3 wherein the key transponder is enabled to send safety alert functions to the car.

8. An integrated vehicle communications system as set forth in claim 1 wherein the transponder means and means for providing RF communication are adapted for enabling transactions with a facility external of the vehicle.

9. An integrated vehicle communications system as set forth in claim 8 wherein the transactions with a facility external of the vehicle are for toll authorization.

10. An integrated vehicle communications system as set forth in claim 9 wherein the transactions with a facility external of the vehicle are for premises authorization.

11. An integrated vehicle communications system as set forth in claim 8 wherein said transponder means is capable of reading from an external data source.

12. An integrated vehicle communications system as set forth in claim 1 wherein said transponder means provides communication to said interrogation means indicative that a part or component of said vehicle is present.

13. An integrated vehicle communications system as set forth in claim 1 wherein said transponder means is capable of reading from an on-board data source representative of the vehicle's condition.

14. An integrated vehicle communications system as set forth in claim 13 wherein said condition is temperature.

15. An integrated vehicle communications system as set forth in claim 1 wherein said transponder can be read from and written to by said interrogation means.

16. An integrated vehicle communications system as set forth in claim 1 wherein said transponder is operated in read only mode such that said interrogation means reads from but does not write to said transponder means.

17. An integrated vehicle communications system for on-board use within a vehicle, the system comprising:

a plurality of miniaturized, self-contained read/write transponders on-board the vehicle, each capable of using energy of radio frequency interrogation as a source of power for a respective read/write transponder operation, and each associated with a vehicle function;

an interrogation means on-board the vehicle for interrogating and receiving signals from the respective transponders; and means for providing RF communication between the interrogation means and each of the transponders for read/write responder operation by the transponders in response to interrogation operation of the interrogation means; and means responsive to the interrogation means for carrying out on-board functions in response to such interrogation.

18. An integrated vehicle communications system as set forth in claim 17 wherein the means for providing RF communication between the interrogation means and each of the transponders comprises a multiplexer interconnected with the interrogation means and respective antenna connected with the multiplexer for RF communication with respective transponders.

19. The integrated vehicle communications system of claim 18 wherein said interrogation means includes a controller and further including a satellite interrogator controlled or activated by said controller.

20. An integrated vehicle communications system as set forth in claim 17 wherein the means responsive to the interrogation means for carrying out on-board functions in response to such interrogation comprises operator display means for displaying system information to the vehicle operator system information in display format to the operator in response to interrogation/responder operation.

21. An integrated vehicle communications system as set forth in claim 17 wherein the means responsive to the interrogation means for carrying out on-board functions in response to such interrogation comprises means for carrying out specific vehicle on-board functions, in response to interrogation/responder operation.

22. An integrated vehicle communications system as set forth in claim 17 and further comprising a key transponder to replace or supplement a conventional vehicle key for vehicle entry control.

23. An integrated vehicle communications system as set forth in claim 17 wherein one of the transponders and the means for providing RF communication are adapted for enabling transactions with a facility external of the vehicle.

24. An integrated vehicle communications system as set forth in claim 23 wherein the transactions with a facility external of the vehicle are for toll authorization.

25. An integrated vehicle communications system as set forth in claim 23 wherein the transactions with a facility external of the vehicle are for premises authorization.

26. An integrated vehicle communications system as set forth in claim 23 wherein at least one of the transponders is capable of reading from an external data source.

27. An integrated vehicle communications system as set forth in claim 23 wherein at least one of the transponders is capable of writing to and reading from data sources, and at least one of the sources is external of the vehicle to provide information to the operator of the vehicle.

28. An integrated vehicle communications system as set forth in claim 17 Wherein the interrogation means provides interrogating of the transponders at intervals measured in the order of seconds for a durations measured in the order of a few milliseconds.

29. An integrated vehicle communications system as set forth in claim 17 wherein each of the transponders carries data which uniquely identifies the respective transponder to the interrogation means.

30. An integrated vehicle communications system as set forth in claim 17 wherein one of said transponder means provide communication to said interrogation means indicative that a part or component of said vehicle is present.

31. An integrated vehicle communications system as set forth in claim 17 wherein at least one of said transponders is capable of reading from an on-board data source representative of the vehicle's condition.

32. An integrated vehicle communications system as set forth in claim 31 wherein said condition is temperature.

* * * * *